US012749967B2

(12) United States Patent
Woo et al.

(10) Patent No.: US 12,749,967 B2
(45) Date of Patent: Sep. 29, 2026

(54) POWER FACTOR CORRECTION CIRCUIT ACCOUNTING FOR ZERO CROSSING DELAY

(71) Applicant: SAMSUNG ELECTRONICS CO., LTD., Suwon-si (KR)

(72) Inventors: Wonmyung Woo, Suwon-si (KR); Duhee Jang, Suwon-si (KR); Jeongil Kang, Suwon-si (KR); Hyungwan Kim, Suwon-si (KR); Sanghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 367 days.

(21) Appl. No.: 18/237,122

(22) Filed: Aug. 23, 2023

(65) Prior Publication Data

US 2024/0136920 A1 Apr. 25, 2024
US 2024/0235383 A9 Jul. 11, 2024

Related U.S. Application Data

(63) Continuation of application No. PCT/KR2023/010885, filed on Jul. 27, 2023.

(30) Foreign Application Priority Data

Oct. 19, 2022 (KR) ........................ 10-2022-0135080

(51) Int. Cl.
*H02M 1/42* (2007.01)
*H02M 1/38* (2007.01)

(52) U.S. Cl.
CPC ......... *H02M 1/4225* (2013.01); *H02M 1/385* (2021.05)

(58) Field of Classification Search
CPC .................................................. H02M 1/4225
See application file for complete search history.

(56) References Cited

U.S. PATENT DOCUMENTS 7,116,090 B1 10/2006 Yang et al.
8,102,165 B2 1/2012 Gu et al.
(Continued)

FOREIGN PATENT DOCUMENTS

CN 111669042 A 9/2020
CN 112838757 A 5/2021
(Continued)

OTHER PUBLICATIONS

International Search Report (PCT/ISA/210) issued by the International Searching Authority on Nov. 20, 2023 in corresponding International Application No. PCT/KR2023/010885.
(Continued)

*Primary Examiner* — Peter M Novak
(74) *Attorney, Agent, or Firm* — Sughrue Mion, PLLC

(57) ABSTRACT

The present disclosure provides power supply apparatuses and controlling methods thereof. In some embodiments, a power supply apparatus includes a power factor correction (PFC) circuit, and a control circuit configured to control the PFC circuit. The PFC circuit includes a power inputter configured to receive alternating current voltage to be rectified, an inductor having an end coupled to an end of the power inputter, a first switching element configured to be turned on and off according to a first control signal, a second switching element configured to be turned on and off according to a second control signal, and an outputter configured to output a direct current voltage through an output capacitor. The control circuit is further configured to respectively apply the first and second control signals to the first and
(Continued)

second switching elements such that the first and the second switching elements are alternately turned on.

17 Claims, 9 Drawing Sheets

(56) References Cited

U.S. PATENT DOCUMENTS

| | | | | |
|---|---|---|---|---|
| 8,320,144 | B2 | 11/2012 | Lee | |
| 9,431,896 | B2 | 8/2016 | Ye | |
| 9,438,131 | B2 | 9/2016 | Lee | |
| 2010/0007317 | A1 | 1/2010 | Yang | |
| 2011/0110127 | A1 | 5/2011 | Lee | |
| 2013/0235631 | A1 | 9/2013 | Pahlevaninezhad et al. | |
| 2014/0340949 | A1* | 11/2014 | Chen | H02M 1/4225 363/44 |
| 2015/0049528 | A1* | 2/2015 | De Rooij | H02M 1/4233 323/208 |
| 2015/0102786 | A1 | 4/2015 | Kim et al. | |
| 2015/0303790 | A1* | 10/2015 | Lin | H02M 1/4225 363/89 |
| 2015/0303813 | A1 | 10/2015 | Cheng et al. | |
| 2018/0331682 | A1* | 11/2018 | Duduman | H02M 1/38 |
| 2020/0259415 | A1* | 8/2020 | Chiu | H02M 3/1584 |
| 2022/0014092 | A1 | 1/2022 | Ren et al. | |

FOREIGN PATENT DOCUMENTS

| | | | |
|---|---|---|---|
| CN | 114204830 | A | 3/2022 |
| JP | 6916451 | B2 | 8/2021 |
| JP | 6971869 | B2 | 11/2021 |
| KR | 10-1030798 | B1 | 4/2011 |
| KR | 10-2015-0044501 | A | 4/2015 |
| KR | 10-1851930 | B1 | 4/2018 |
| KR | 10-2022-0012729 | A | 2/2022 |

OTHER PUBLICATIONS

Written Opinion (PCT/ISA/237) issued by the International Searching Authority on Nov. 20, 2023 in corresponding International Application No. PCT/KR2023/010885.

Extended European Search Report issued Sep. 15, 2025 by the European Patent Office for EP Patent Application No. 23879960.5.

* cited by examiner

POWER FACTOR CORRECTION CIRCUIT ACCOUNTING FOR ZERO CROSSING DELAY

CROSS-REFERENCE TO RELATED APPLICATIONS

This application is a continuation application of International Application No. PCT/KR2023/010885, filed on Jul. 27, 2023, which claims priority to Korean Patent Application No. 10-2022-0135080, filed on Oct. 19, 2022, in the Korean Intellectual Property Office, the disclosures of which are incorporated by reference herein in their entireties.

BACKGROUND

1. Field

The present disclosure relates generally to a power supply apparatus and a controlling method thereof and, more particularly, to a power supply apparatus including a power factor correction (PFC) circuit and a controlling method thereof.

2. Description of the Related Art

Along with developments and/or advances in electronic technology, nonlinear load weights on power supplies may have increased. Consequently, the possibility of damage due to harmonics to electronic equipment powered by these power supplies may have increased.

Accordingly, many countries may enforce regulations that may require that a power supply in an electronic device needs to have a power factor correction (PFC) function in order to prevent damage due to the harmonics. For example, an active PFC circuit such as the PFC converter 1 of FIG. 1 may need to be included in the power supply apparatus 10 in order to comply with regulations.

As shown in FIG. 1, the PFC converter 1 may convert an alternating current (AC) input voltage into a direct current (DC) voltage and/or may correct a power factor in a power supply apparatus 10.

SUMMARY

According to an aspect of the present disclosure, a power supply apparatus is provided. The power supply apparatus includes a power factor correction (PFC) circuit, and a control circuit configured to control an operation of the PFC circuit. The PFC circuit includes a power inputter configured to receive alternating current (AC) voltage to be rectified. The PFC circuit further includes an inductor having a first end coupled to a first end of the power inputter. The PFC circuit further includes a first switching element configured to be turned on and turned off, according to a first control signal, and having a first end coupled to a second end of the inductor. The PFC circuit further includes a second switching element configured to be turned on and turned off, according to a second control signal, and having a first end commonly coupled to the second end of the inductor and the first end of the first switching element. The PFC circuit further includes an outputter configured to output a direct current (DC) voltage through an output capacitor, and having a first end coupled to a second end of the second switching element and a second end coupled to a second end of the first switching element. The control circuit is further configured to apply the first control signal to the first switching element and the second control signal to the second switching element such that the first switching element and the second switching element are alternately turned on.

In some embodiments, the PFC circuit may further include a sensing resistor having a first end coupled to the second end of the first switching element and second end coupled to a second end of the power inputter. In such embodiments, the control circuit may be further configured to, based on a sensing voltage applied to the second end of the sensing resistor reaching a control voltage, turn off the first switching element through the first control signal. The control voltage may have been determined based on the DC voltage output through the outputter.

In some embodiments, the control circuit may include an error amplifier configured to amplify and output a difference between a voltage distribution value of the DC voltage and a first reference voltage. In such embodiments, the control circuit may further include a first comparator configured to compare the control voltage and the sensing voltage. The control voltage may be a reverse of an output of the error amplifier. In such embodiments, the control circuit may be further configured to determine whether the sensing voltage reaches the control voltage based on an output of the first comparator.

In some embodiments, the control circuit may be further configured to turn off the first switching element through the first control signal before the sensing voltage reaches the control voltage, based on a predetermined time being elapsed from a time point when the first switching element is turned on.

In some embodiments, the control circuit may include a sawtooth generator configured to generate a sawtooth wave in which a voltage rises at a predetermined slope from a time when the first switching element is turned on. The control circuit may further include a second comparator configured to compare the sawtooth wave output from the sawtooth generator with a second reference voltage. The control circuit may be further configured to generate, based on an output of the second comparator, the first control signal for turning off the first switching element.

In some embodiments, the predetermined time may be preset to a maximum time interval on which the first switching element is turned on at a minimum voltage of the AC voltage.

In some embodiments, the control circuit may be further configured to turn on the second switching element through the second control signal after a first deadtime from a first time point when the first switching element is turned off. The control circuit may be further configured to turn on the first switching element through the first control signal after a second deadtime from a second time point when the second switching element is turned off.

In some embodiments, a first duration of the first deadtime may be different from a second duration of the second deadtime.

In some embodiments, the control circuit may be further configured to turn off the second switching element through the second control signal after a predetermined delay time from a third time point when a current of the inductor becomes zero.

In some embodiments, the PFC circuit may further include a sensing resistor having a first end coupled to the second end of the first switching element and a second end coupled to a second end of the power inputter. In such embodiments, the control circuit may include a third comparator configured to compare a sensing voltage applied to the second end of the sensing resistor with a critical voltage. In such embodiments, the control circuit may be further configured to determine the third time point at which the current of the inductor becomes zero based on an output of the third comparator.

In some embodiments, the control circuit may further include a digital circuit configured to generate the first deadtime, the second deadtime, and a preset delay time.

According to an aspect of the present disclosure, a method of controlling a power supply apparatus is provided. The method includes turning off a second switching element of the power supply apparatus configured to discharge current charged in an inductor while a first switching element of the power supply apparatus configured to charge current in the inductor is being turned on. The method further includes turning off the first switching element while the second switching element is being turned on.

In some embodiments, the method may further include turning off the first switching element, based on a sensing voltage sensed through a sensing resistor reaching a control voltage determined based on a DC voltage output.

In some embodiments, the method may further include turning off the first switching element before the sensing voltage reaching the control voltage, based on a predetermined time being elapsed from a time when the first switching element is turned on.

In some embodiments, the predetermined time may be preset to a maximum time interval on which the first switching element is turned on at a minimum voltage of a received AC voltage.

In some embodiments, the method may further include generating, based on a comparison between a sawtooth wave and a second reference voltage, a first control signal for turning off the first switching element.

In some embodiments, the method may further include determining whether the sensing voltage reaches the control voltage based on a comparison of the control voltage and the sensing voltage. The control voltage may be a reverse of an output of an error amplifier. The output of the error amplifier may be an amplified difference between a voltage distribution value of the DC voltage and a first reference voltage.

In some embodiments, the method may further include turning on the second switching element through a second control signal after a first deadtime from a first time point when the first switching element is turned off. In such embodiments, the method may further include turning on the first switching element through a first control signal after a second deadtime from a second time point when the second switching element is turned off.

In some embodiments, the method may further include turning off the second switching element through the second control signal after a predetermined delay time from a third time point when the current of the inductor becomes zero.

According to an aspect of the present disclosure, a power supply apparatus is provided. The power supply apparatus includes a PFC circuit, and a control circuit configured to control an operation of the PFC circuit. The PFC circuit includes a power inputter configured to receive an AC voltage to be rectified. The PFC circuit further includes an inductor having a first end coupled to a first end of the power inputter. The PFC circuit further includes a first switching element configured to be turned on and turned off, according to a first control signal, and having a first end coupled to a second end of the inductor. The PFC circuit further includes a second switching element configured to be turned on and turned off, according to a second control signal, and having a first end commonly coupled to the second end of the inductor and the first end of the first switching element. The PFC circuit further includes an outputter configured to output a DC voltage through an output capacitor, and having a first end coupled to a second end of the second switching element and a second end coupled to a second end of the first switching element. The control circuit is further configured to apply the first control signal to the first switching element and the second control signal to the second switching element such that the first switching element and the second switching element are alternately turned on. The control circuit is further configured to turn on the second switching element through the second control signal after a first deadtime from a first time point when the first switching element is turned off. The control circuit is further configured to turn on the first switching element through the first control signal after a second deadtime from a second time point when the second switching element is turned off.

Additional aspects may be set forth in part in the description which follows and, in part, may be apparent from the description, and/or may be learned by practice of the presented embodiments

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
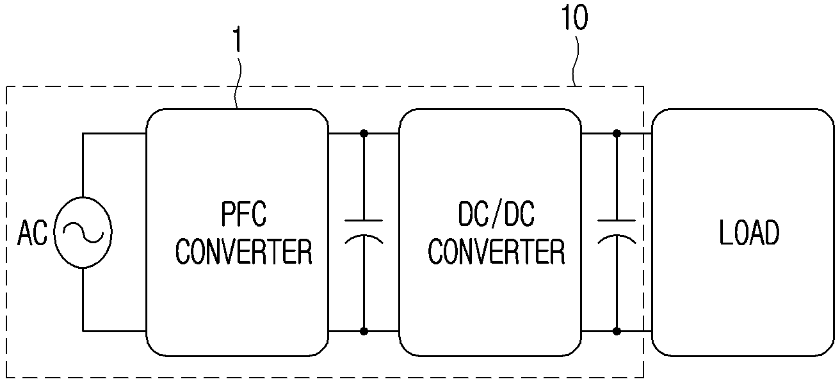
FIG. 1 is a block diagram of a power supply apparatus including a power factor correction (PFC) converter, according to one or more embodiments of the disclosure.

Herein, detailed descriptions of related art techniques may be omitted to not obscure the description. In addition, the description of the same configurations may be omitted.

The suffix "part" for a component used herein is added or used in consideration of the convenience of the specification, and it is not intended to have a meaning or role that is distinct from each other.

The terminology used herein is to describe an embodiment, and is not limiting. A singular expression includes plural expressions unless the context clearly indicates otherwise.

As used herein, terms such as, but not limited to, "has," "may have," "includes", "may include", and the like, may indicate the existence of a corresponding feature (e.g., a numerical value, a function, an operation, or a constituent element such as a component), but may not exclude the existence of an additional feature.

As used herein, terms such as, but not limited to, "1st" or "first," "2nd" or "second," and the like, may modify corresponding components regardless of importance or order and may be used to distinguish one component from another without limiting the components.

If it is described that an element (e.g., first element) is "operatively or communicatively coupled with/to" or is "connected to" another element (e.g., second element), it may be understood that the element may be connected to the other element directly or through still another element (e.g., third element).

When it is mentioned that one element (e.g., first element) is "directly coupled" with or "directly connected to" another element (e.g., second element), it may be understood that there is no element (e.g., third element) present between the element and the other element.

The terms used herein may be interpreted in a meaning commonly known to those of ordinary skill in the art unless otherwise defined.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments of the present disclosure are described with reference to the accompanying drawings.

Figure 2A:
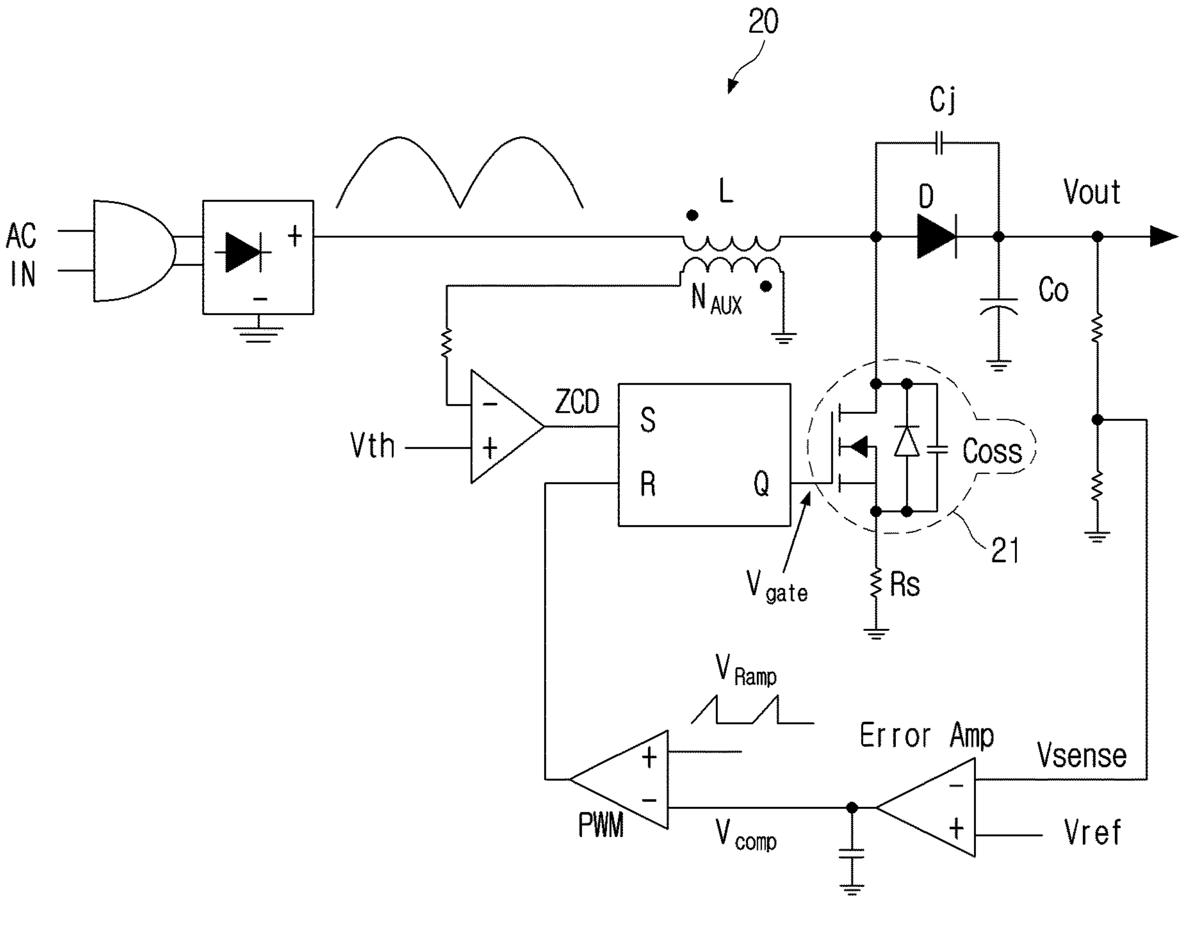
FIG. 2A is an exemplary diagram of a PFC converter circuit operating in a critical conduction mode (CRM), according to one or more embodiments of the disclosure.
Figure 2B:
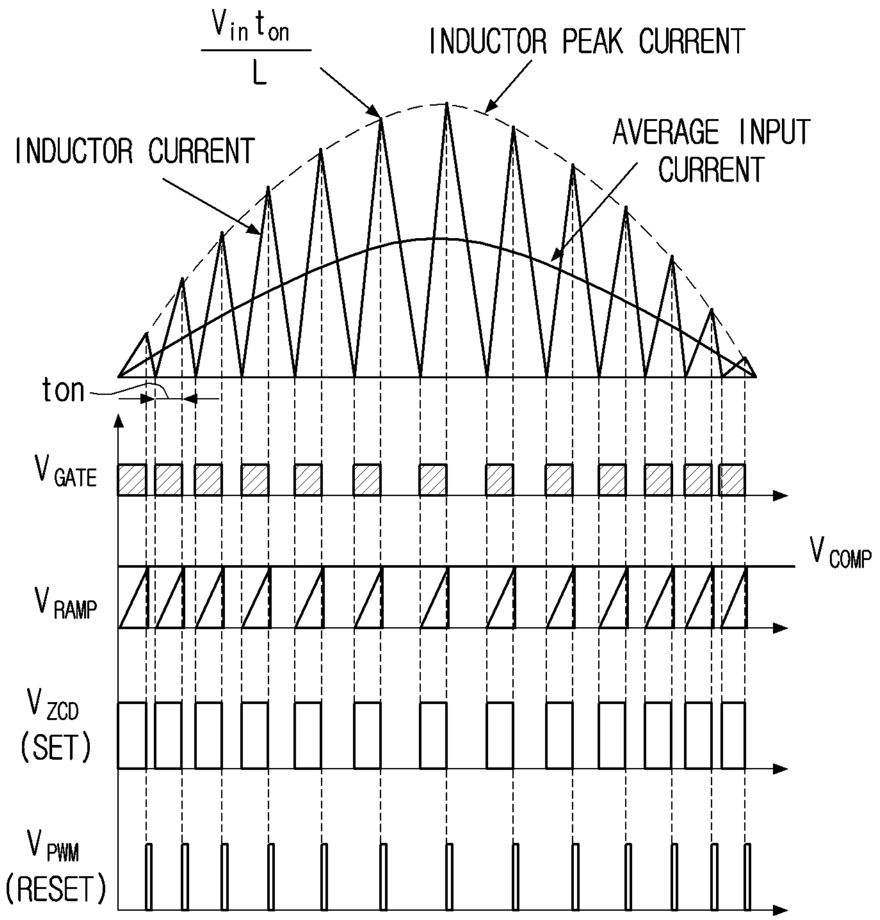
FIG. 2B is a diagram illustrating a main operational waveform of the PFC converter circuit of FIG. 2A, according to one or more embodiments of the disclosure.

FIG. 1 is a block diagram of a power supply apparatus including a power factor correction (PFC) converter, according to one or more embodiments of the disclosure. FIG. 2A is an exemplary diagram of a PFC converter circuit operating in a critical-conduction mode (CRM), according to one or more embodiments of the disclosure. FIG. 2B is a diagram illustrating a main operational waveform of the PFC converter circuit of FIG. 2A, according to one or more embodiments of the disclosure.

A related technology that may be used in a low-power application field among active PFC circuits may be a CRM boost PFC circuit 20, as shown in FIG. 2A. The CRM may refer to a method of turning on a switching element (e.g., switching element 21) when the current of the inductor L reaches zero (0).

The CRM boost PFC circuit 20 may be advantageous in that there may be minimal to substantially no loss due to a diode reverse recovery phenomenon, when compared to a continuous conduction mode (CCM) method. However, since a ripple current of the CRM boost PFC circuit 20 may be relatively high (e.g., a peak value of inductor current may become two times (2×) of the input current), the CRM boost PFC circuit 20 may be useful for an electronic device that may need power less than or equal to 300 watts (W), such as, but not limited to, a television (TV).

In an embodiment, a voltage mode control method may be used as a control method of the CRM boost PFC circuit 20.

As shown in FIGS. 2A and 2B, a voltage signal $V_{GATE}$ may be applied to the gate terminal of the switching element 21, such that the switching element 21 of the CRM boost PFC circuit 20 may have a constant on time $t_{on}$ during the driving cycle.

In the voltage mode control method, an on-time $t_{on}$ of the switching element 21 may be determined by a control voltage $V_{COMP}$, which may be an output of a voltage loop corrector (e.g., Error Amp), and a sawtooth waveform $V_{RAMP}$, which may have a constant rising inclination.

When the switching element 21 is turned on, the sawtooth waveform may begin to rise, and when the voltage of the sawtooth waveform becomes substantially similar with and/or the same as the control voltage $V_{COMP}$, the switching element 21 may be turned off and/or the sawtooth waveform may be reset to zero (0). For example, the switching element 21 may be turned off according to voltage signal $V_{PWM}$.

The current of the inductor L may increase while the switching element 21 is turned on. Alternatively or additionally, the current of the inductor L may start to decrease when the switching element 21 is turned off. When the time point at which the inductor current reaches zero is detected by using the auxiliary winding $N_{AUX}$, the switching element 21 may be turned on again, and the above-described operation may be repeated. For example, the switching element 21 may be turned on again according to voltage signal $V_{ZCD}$, where ZCD may refer to zero current detection.

Through operation of the voltage mode control method described above, the peak value of the inductor current may have a triangular shape that may follow the sinusoidal contour of the rectified input voltage so that the power factor may be automatically corrected.

As shown in FIG. 1, the two-stage power supply apparatus 10, including the PFC converter 1, may be required to improve the efficiency of the PFC converter 1 in order to improve the overall efficiency since the overall efficiency may be calculated as a product of the efficiency of each stage.

However, efficiency improvement of the CRM-boost PFC circuit 20 may be limited due to a relatively high peak value of the inductor current that may be up to two times (2×) the input current. Alternatively or additionally, the size of the inductor L of the CRM-boost PFC circuit 20 may be increased to prevent saturation of the inductor L due to the relatively high peak value of the inductor current. Therefore, there is a need to develop a technology capable of reducing an inductor size of a CRM-based PFC converter and/or maximizing efficiency within a range corresponding to a harmonic standard (e.g., International Electrotechnical Commission (IEC) 61000-3-2 Electromagnetic Compatibility (EMC)).

Figure 3:
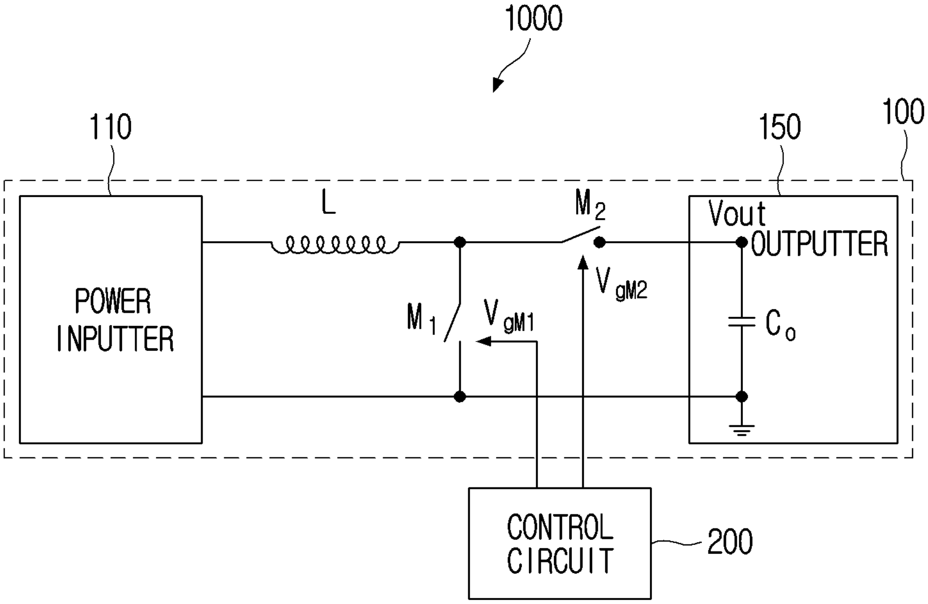
FIG. 3 is a block diagram of a power supply apparatus, according to one or more embodiments of the disclosure.

FIG. 3 is a block diagram of a power supply apparatus, according to one or more embodiments of the disclosure.

The power supply apparatus 1000 may be included in an electronic apparatus and/or may supply direct current (DC) power to one or more components of the electronic apparatus. The electronic apparatus may be and/or may include, a desktop computer, a computer server, a virtual machine, a network appliance, a mobile device (e.g., a laptop computer, a tablet computer, a personal digital assistant (PDA), a smart phone, any other type of mobile computing device, and the like), a wearable device (e.g., smart watch, headset, headphones, and the like), a smart device (e.g., a voice-controlled virtual assistant, a set-top box (STB), a refrigerator, an air conditioner, a microwave, a television, and the like), a home appliance, a display device, an audio device, an Internet-of-Things (IoT) device, and/or any other type of data processing device. However, the present disclosure is not limited in this regard. Notably the aspects presented herein may be employed in any type of electronic device having an input power rating of about 300 watts (W) or less. The power supply apparatus 1000 may be implemented as a device separate from the electronic apparatus, and/or may be connected to the electronic apparatus to supply DC power to various configurations of the electronic apparatus.

Referring to FIG. 3, the power supply apparatus 1000 may include a PFC circuit 100 and a control circuit 200.

The PFC circuit 100, according to an embodiment, may receive control from the control circuit 200. Alternatively or additionally, the PFC circuit 100 may convert alternating current (AC) voltage to the DC voltage and may output the same.

In an embodiment, as shown in FIG. 3, the PFC circuit 100 may include a power inputter 110 configured to receive AC voltage for rectification, an inductor L having an end connected to an end of the power inputter 110, a first switching element $M_1$ having an end connected to another end of the inductor L, a second switching element $M_2$ having an end commonly connected to the other end of the inductor L and the end of the first switching element $M_1$, and an outputter 150 configured to output a DC voltage $V_{OUT}$ through an output capacitor $C_0$ having an end commonly connected to another end of the second switching element $M_2$ and another end connected to another end of the first switching element $M_1$, and another end of the power inputter 110.

The first and second switching elements $M_1$ and $M_2$ may be implemented using a power semiconductor transistor such as, but not limited to, a metal-oxide-semiconductor field effect transistor (MOSFET), a bipolar junction transistor (BJT), an insulated gate bipolar transistor (IGBT), and the like.

The control circuit 200 may control an operation of the PFC circuit 100. That is, the control circuit 200 may control an operation of the PFC circuit 100 by controlling on/off operation of the first switching element $M_1$ and second switching element $M_2$.

For example, the control circuit 200 may generate a first control signal $V_{gM1}$ for controlling the on/off operation of the first switching element $M_1$ and/or may apply the first control signal $V_{gM1}$ to the first switching element $M_1$. Alternatively or additionally, the control circuit 200 may generate a second control signal $V_{gM2}$ for controlling the on/off operation of the second switching element $M_2$ and/or may apply the second control signal $V_{gM2}$ to the second switching element $M_2$.

According to one or more embodiments, the control circuit 200 may respectively apply the first control signal $V_{gM1}$ and the second control signal $V_{gM2}$ to the first switching element $M_1$ and the second switching element $M_2$ such that the first switching element $M_1$ and the second switching element $M_2$ may be alternately turned on.

That is, when the first switching element $M_1$ is turned on, the second switching element $M_2$ may be turned off, such that the current of the inductor L may not be transmitted to the outputter 150, and the inductor L may be charged. Alternatively or additionally, when the second switching element $M_2$ is turned on, the first switching element $M_1$ may be turned off, such that the current charged in the inductor L may be discharged to the outputter 150.

According to one or more embodiments, the control circuit 200, if or when the current flowing in the inductor L reaches a certain magnitude, may turn off the first switching element $M_1$ such that current of the inductor L may not exceed a predetermined threshold. Accordingly, the peak current of the inductor L may be reduced, and/or the size of the inductor L may be reduced.

Referring to FIG. 3, unlike FIG. 2A in which a diode D may be used for an output terminal, the second switching element $M_2$ may be disposed in an output terminal of the PFC circuit 100. A loss due to an on resistor $R_{DS\_ON}$ (not shown) of the second switching element $M_2$ may be much smaller than a loss of positive voltage $V_F$ that may occur during conduction of the diode D. Therefore, according to one or more embodiments of the disclosure, the conduction loss of the PFC circuit 100 may be reduced when compared to the related CRM-boost PFC circuit 20.

According to one or more embodiments, even after the current of the inductor L becomes zero (0), the control circuit 200 may turn on the second switching element $M_2$ for a predetermined time. Accordingly, the voltage difference of both terminals of the first switching element $M_1$ may fall to about zero (0), and thus, the switching loss may be minimized.

An example configuration and operation of the power supply apparatus, according to one or more embodiments of the disclosure, is described with reference to FIGS. 4A to 4C.

Figure 4A:
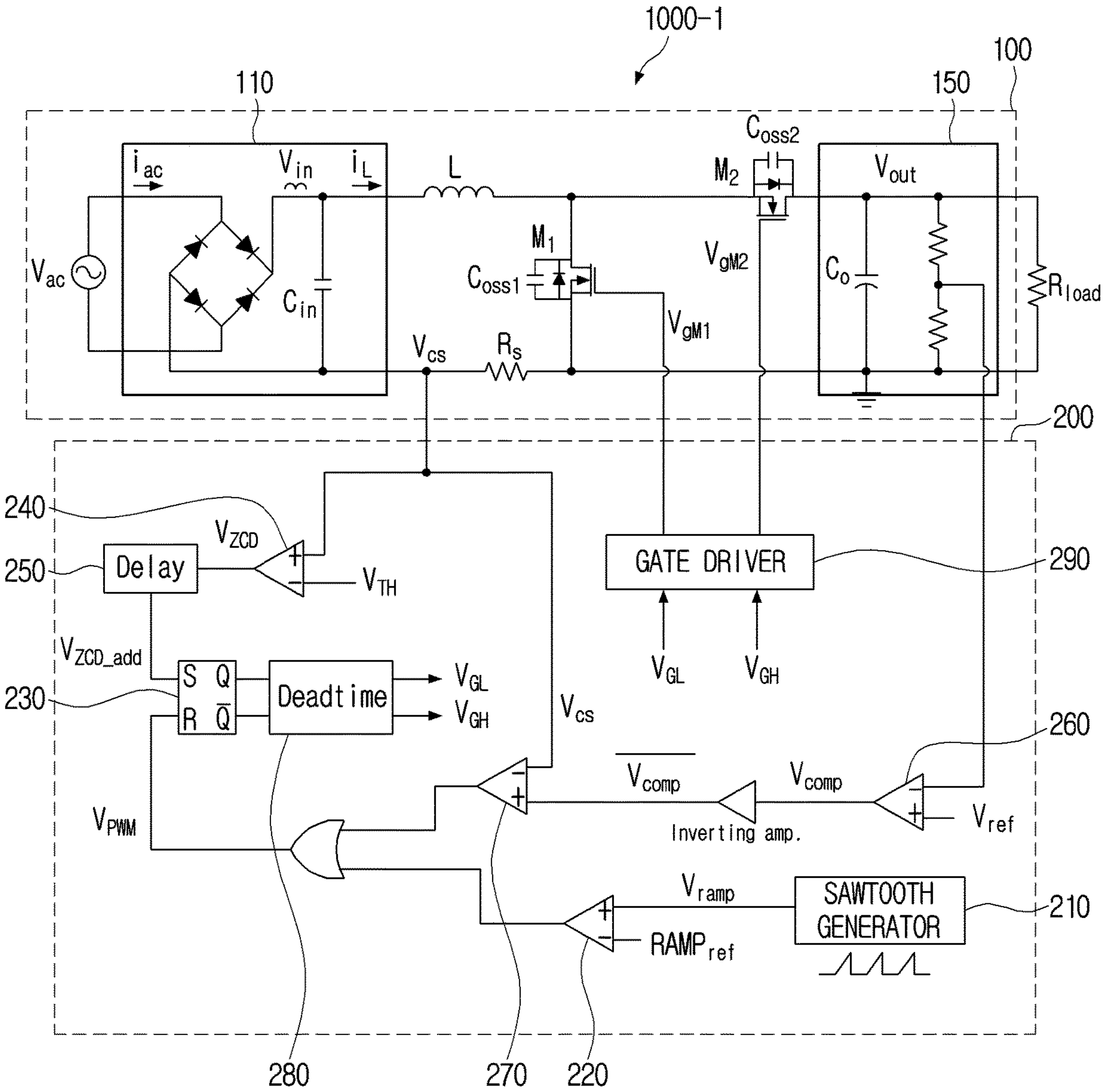
FIG. 4A is a circuit diagram of a power supply apparatus, according to one or more embodiments of the disclosure.

FIG. 4A is a circuit diagram of a power supply apparatus 1000-1, according to one or more embodiments of the disclosure. FIG. 4B is a diagram illustrating a main operational waveform of the power supply apparatus 1000-1, according to one or more embodiments of the disclosure. FIG. 4C is a diagram illustrating a detailed waveform of the power supply apparatus 1000-1, according to one or more embodiments of the disclosure.

The power supply apparatus 1000-1 may include or may be similar in many respects to the power supply apparatus 1000 described above with reference to FIG. 3, and may include additional features not mentioned above.

Referring to FIG. 4A, the control circuit 200 may sense a current flowing through an inductor L. For example, the PFC 100 may include a sensing resistor $R_S$ having an end connected to the other end of the first switching element $M_1$, and having the other end connected to the other end of the power inputter 110. The control circuit 200 may sense a current of the inductor L based on a sensing voltage $V_{CS}$ applied to the other end of the sensing resistor $R_S$.

In an embodiment, the control circuit 200 may control an off operation of the first switching element $M_1$ differently before and after the current of the inductor L reaching the preset magnitude.

For example, while the first switching element $M_1$ is turned on and current of the inductor is rising, if or when the current of the inductor L reaches a predetermined magnitude within a preset time, the control circuit 200 may turn off the first switching element $M_1$ such that the current of the inductor L may no longer increase.

When the first switching element $M_1$ is turned on and the current of the inductor L does not reach a preset magnitude within a preset time, if or when a preset time elapses from the time point when the first switching element $M_1$ is turned on, the control circuit 200 may turn off the first switching element $M_1$.

Figure 4B:
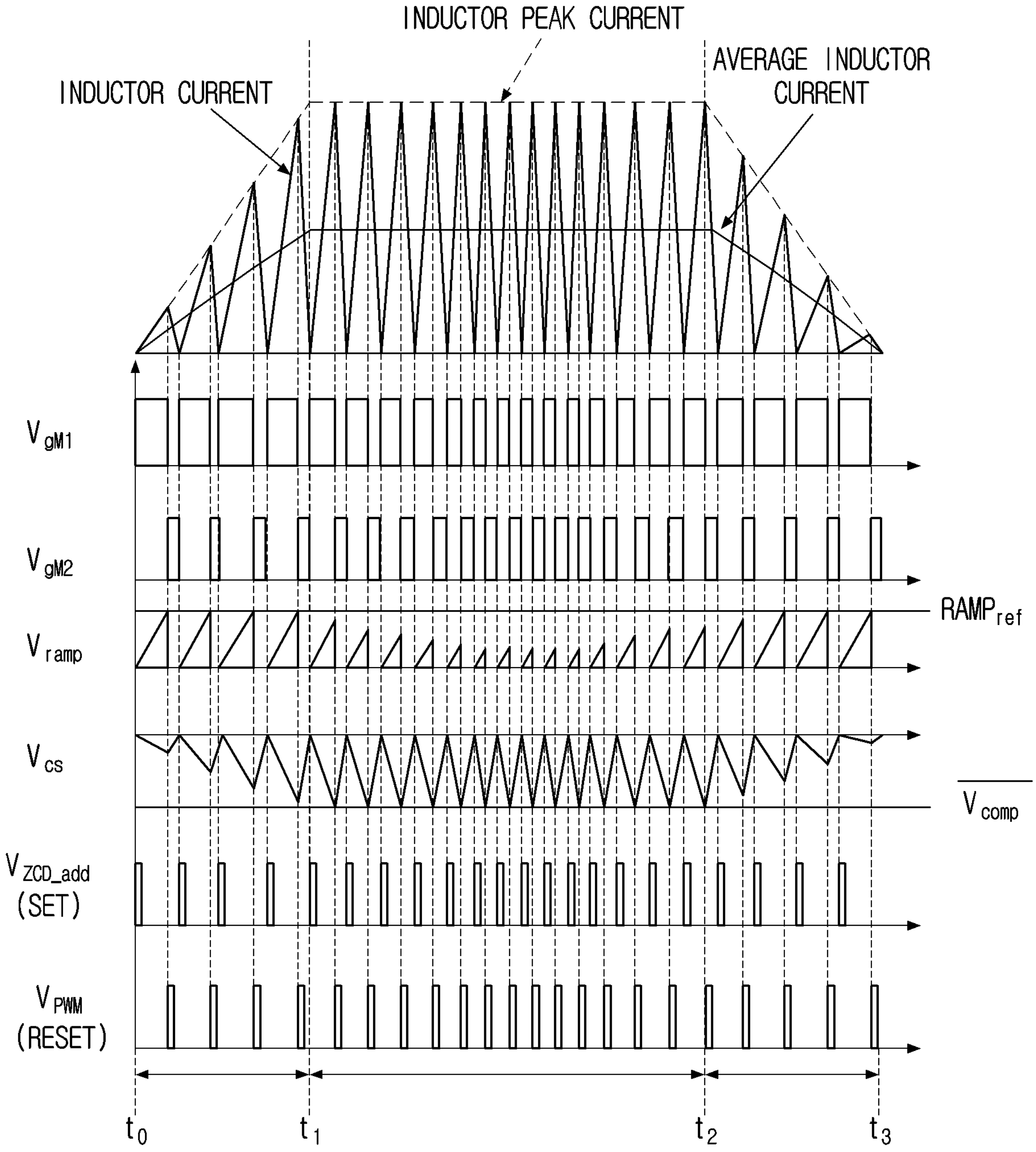
FIG. 4B is a diagram illustrating a main operational waveform of a power supply apparatus, according to one or more embodiments of the disclosure.

As shown in FIG. 4B, the time interval $t_0$ to $t_1$ and the time interval $t_2$ to $t_3$ may indicate time intervals in which the current of the inductor L may not reach a preset magnitude within a preset time, and the time interval $t_1$ to $t_2$ may indicate a time interval in which the current of the inductor L may reach a preset magnitude within a preset time. Compared to FIG. 2B, the peak current of the inductor L may be reduced in the time interval of $t_1$ to $t_2$.

Hereinafter, an operation of the power supply apparatus 1000 during each time interval described above is further described. First, an operation of the power supply apparatus 1000 during the time interval of $t_0$ to $t_1$ is described.

If or when the first switching element $M_1$ is turned on by the first control signal $V_{gM1}$, the current of the inductor L may begin to rise from zero (0).

The first switching element $M_1$ may be turned off when a preset time elapses after the first switching element $M_1$ is turned on. That is, the first switching element $M_1$ may be turned on for a preset time interval.

In this case, the preset time interval (e.g., the maximum on width $T_{ON\_MAX}$), may be preset as a value at which a time interval on which the first switching element $M_1$ is turned on at the minimum voltage of the AC voltage input to the power inputter 110. For example, the preset time interval may be preset using an equation similar to Eq. 1.

$$T_{ON\_MAX} > \frac{2 \times L \times P_0}{(V_{ac\_min})^2 \times \eta} \quad \text{[Eq. 1]}$$

Referring to Eq. 1, $V_{ac\_min}$ represents the minimum input voltage of the AC voltage, L represents an inductance value of the inductor, $P_0$ represents the maximum output power of the PFC, and TI represents the efficiency of the PFC circuit 100.

As such, the first control signal $V_{gM1}$ having the maximum on width $T_{ON\_MAX}$ may be generated through the output of the comparator 220, which may include the output $V_{RAMP}$ of the sawtooth generator 210 and the reference voltage $RAMP_{ref}$ as input during the interval $t_0$ to $t_1$.

That is, according to one or more embodiments of the disclosure, the control circuit 200 may include a sawtooth generator 210 for generating a sawtooth wave ($V_{RAMP}$) in which a voltage rises at a constant slope from the time point when the first switching element $M_1$ is turned on. The comparator 220 may be configured for comparing the sawtooth wave output $V_{RAMP}$ from the sawtooth generator 210 with a reference voltage $RAMP_{ref}$. In an optional or additional embodiment, the control circuit 200 may generate a first control signal $V_{gM1}$ for turning off the first switching element $M_1$ after a preset time $T_{ON\_MAX}$ has elapsed from the time point when the first switching element $M_1$ is turned on.

For example, referring to FIG. 4A, the output $V_{RAMP}$ of the sawtooth generator 210 may start to rise at the time point when the first switching element $M_1$ is turned on. Thereafter, if or when $V_{RAMP}$ reaches $RAMP_{ref}$, $V_{PWM}$ may become high (e.g., one, "1"). That is, the signal $V_{PWM}$ may become a RESET (R) signal of the R-S latch 230. Accordingly, the first control signal $V_{gM1}$ may become low (e.g., zero, "0") and/or the first switching element $M_1$ may be turned off.

When the first switching element $M_1$ is turned off, the second switching element $M_2$ may be turned on by the second control signal $V_{gM2}$ after a predetermined time (e.g., a first deadtime), and current charged in the inductor L may be discharged to the side of the outputter 150, and thereby, the current of the inductor L may begin to decrease. Alternatively or additionally, the output signal $V_{RAMP}$ of the sawtooth generator 210 may be reset to zero (0).

In an embodiment, when the current of the inductor L is reduced to approach near zero (0), the control circuit 200 may sense the current through the sensing resistor $R_S$. According to one or more embodiments of the disclosure, the control circuit 200 may include a comparator 240 for comparing the sensing voltage $V_{CS}$ and the critical voltage $V_{TH}$ and may identify and/or determine the time point at which the current of the inductor L becomes zero based on the output of the comparator 240.

When the current of the inductor L becomes zero (0), the output signal $V_{ZCD}$ of the comparator 240 may become high, and this high signal may be output to $V_{ZCD\_add}$ after a preset delay time after passing through the delay circuit 250. The $V_{ZCD}$ add signal may become the SET (S) signal of the R-S latch 230 and Q may be set to ON again, and $\overline{Q}$ may be turned off and the second switching element $M_2$ may be turned off. If or when the second switching element $M_2$ is turned off, the first switching element $M_1$ may be turned on after a predetermined time (e.g., a second deadtime).

When the first switching element $M_1$ is turned on, the output $V_{RAMP}$ of the sawtooth generator 210 may begin to rise again. The above operation may repeat before the sensing voltage VCS reaches the control voltage $\overline{V_{COMP}}$ as described below.

Hereinbelow, the operation of the power supply apparatus 1000 during the interval of $t_1$ to $t_2$ is described.

As described above, the control circuit 200 may turn off the first switching element $M_1$ when the first switching element $M_1$ is turned on and the current of the inductor L may rise and then the current of the inductor L may reach a preset size within a preset time $T_{ON\_MAX}$.

That is, the current of the inductor L may be sensed by the sensing voltage $V_{CS}$, the control circuit 200, when the sensing voltage $V_{CS}$ reaches the control voltage $\overline{V_{COMP}}$, may turn off the first switching element $M_1$ through the first control signal $V_{gM1}$.

In an embodiment, the control circuit 200 may include an error amplifier 260 configured to amplify and output a difference between a voltage distribution value of a DC voltage output from the outputter 150 and a reference voltage $V_{ref}$. The control circuit 200 may further include a comparator 270 configured to compare a control voltage $\overline{V_{COMP}}$ with a sensing voltage $V_{CS}$ with an inverted voltage of the error amplifier 260. In an optional or additional embodiment, the control circuit 200 may determine whether the sensing voltage $V_{CS}$ reaches the control voltage $\overline{V_{COMP}}$ (e.g., whether the current of inductor L reaches a preset magnitude) based on the output of the comparator 270.

After the first switching element $M_1$ is turned on and before a preset time $T_{ON\_MAX}$ has been reached, if or when the sensing voltage $V_{CS}$ reaches the control voltage $\overline{V_{COMP}}$, the $V_{PWM}$ signal may become high. That is, the signal $V_{PWM}$ may become a RESET (R) signal of the R-S latch 230 to turn off Q, and the first control signal $V_{gM1}$ may be low and the first switching element $M_1$ may be turned off. Alternatively or additionally, the output of the sawtooth generator $V_{RAMP}$ may reset to zero (0).

When the first switching element $M_1$ is turned off, after a predetermined time (e.g., a first deadtime), the second control signal $V_{gM2}$ may become high, and the second switching element $M_2$ may be turned on, and the current charged in the inductor L may be discharged toward the outputter 150 to start to decrease the current of the inductor L.

Alternatively or additionally, when the current of the inductor L decreases and reaches zero (0), the output $V_{ZCD}$ of the comparator 240 may become high by sensing through the sensing resistor $R_S$, as described above. The $V_{ZCD}$ signal may be outputted as $V_{ZCD\_add}$ after a predetermined delay time after passing through the delay circuit 250. The $V_{ZCD\_add}$ signal may become a SET (S) signal of the R-S latch 230, and Q may be reset to ON, and $\overline{Q}$ may be turned off, and the second switching element $M_2$ may be turned off.

When the second switching element $M_2$ is turned off, the first switching element $M_1$ may be turned on after a predetermined time (e.g., second deadtime).

The above operation may be repeated while the sensing voltage $V_{C}s$, which is changing over the current of the inductor L, reaches the control voltage $\overline{V_{COMP}}$.

During the time interval $t_2$ to $t_3$, the sensing voltage $V_{CS}$ may not reach the control voltage $\overline{V_{COMP}}$, so the same operation may be repeated during the time interval $t_0$ to $t_2$.

The power factor improvement and harmonic reduction operation may be performed together by controlling output voltage $V_{OUT}$ of the PFC circuit 100 through the operation of $t_0$ to $t_3$ as described above. Alternatively or additionally, the AC input current waveform may be controlled in a trapezoidal shape, such that a power factor improvement and a harmonic reduction operation may be performed. In addition, since the peak of the current of the inductor L is suppressed to have a trapezoidal shape, the inductor peak current may be reduced compared to a related CRM PFC converter.

In some embodiments, the first deadtime and the second deadtime may be implemented by the deadtime generator 280 as a time for preventing the first and second switching elements $M_1$ and $M_2$ from being turned on at the same time. According to one or more embodiments of the disclosure, the first deadtime and the second deadtime may be differently controlled. That is, the deadtime generator 280 may configure the first deadtime and the second deadtime to have different values.

The delay circuit 250 and/or the deadtime generator 280 may be implemented by various methods such as an analog method, a digital method, or a method in which an analog method and a digital method are mixed.

The output $V_{GL}$ of the deadtime generator 280 may be outputted to the first control signal $V_{gM1}$ through the gate driver 290. Alternatively or additionally, the output $V_{GH}$ of the deadtime generator 280 may be outputted to the second control signal $V_{gM2}$ through the gate driver 290. In an embodiment, the second switching element $M_2$ may not be connected to the ground terminal. Therefore, the gate driver 290 may perform a high side gate driving operation through bootstrapping for the on/off operation of the second switching element $M_2$.

According to one or more embodiments of the disclosure, an output side diode of an existing PFC circuit may be replaced with a second switching element $M_2$, as shown in FIG. 4A. In an optional or additional embodiment, the second switching element $M_2$ may be referred to as a synchronous rectification switch.

In the case of the second switching element $M_2$, on/off control may be possible through the control circuit 200 unlike a diode, such that the second switching element $M_2$ may be conducted even after the current of the inductor L is reduced to zero (0).

Figure 4C:
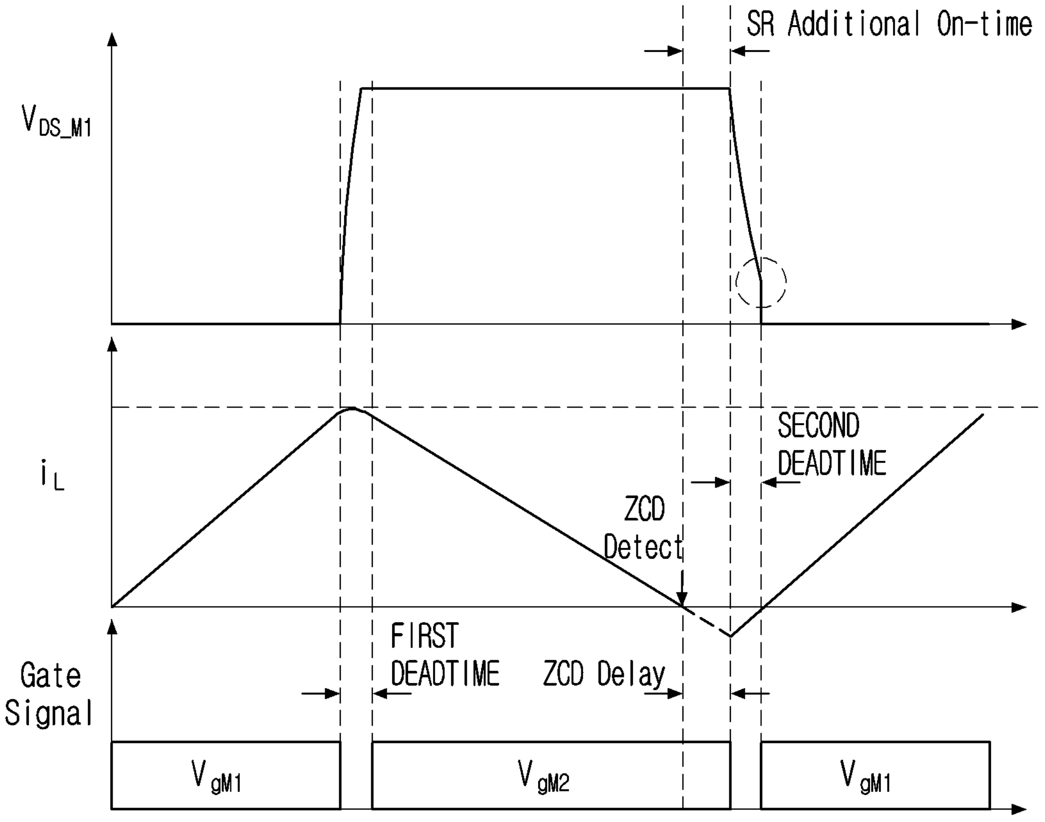
FIG. 4C is a diagram illustrating a detailed waveform of a power supply apparatus, according to one or more embodiments of the disclosure.

In the operation waveform of FIG. 4C, the SR additional on-time may be implemented through the delay circuit 250 of FIG. 4A. An inductor current $i_L$ having a negative value added through SR additional on-time additionally may provide energy required for zero voltage switching of the first switching element $M_1$, and may cause a voltage $V_{DS\_M1}$ of both terminals of the first switching element $M_1$ to fall to almost zero (0), such that switching loss may be minimized. Alternatively or additionally, as described above, by using the second switching element $M_2$ instead of a diode, conduction loss may be reduced.

That is, by reducing switching loss and/or conduction loss, efficiency of the power supply apparatus 1000 may be improved when compared to a related power supply apparatus.

Figure 5:
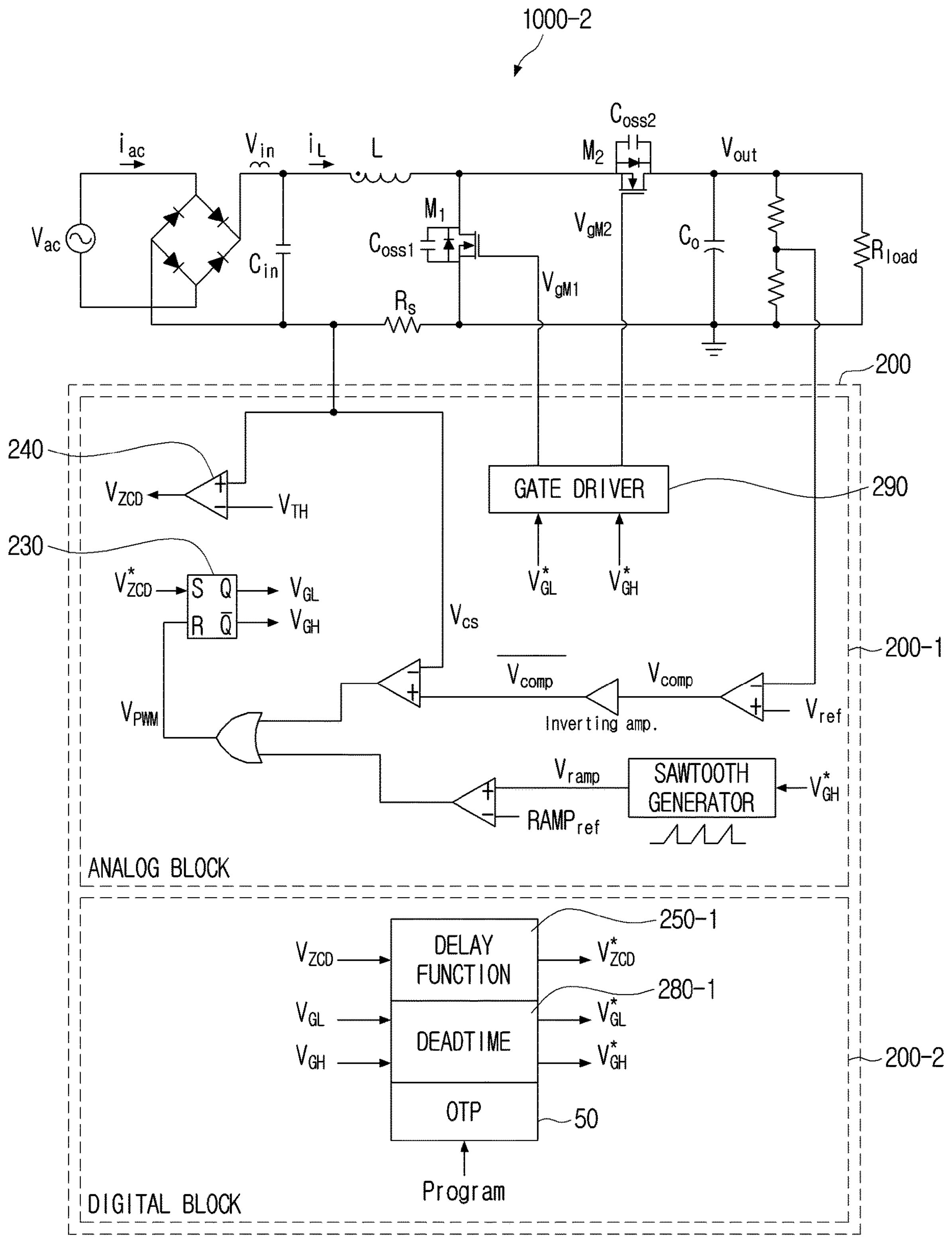
FIG. 5 is a circuit diagram of a power supply apparatus, according to one or more embodiments of the disclosure.

FIG. 5 is a circuit diagram of the power supply apparatus 1000-2, according to one or more embodiments of the disclosure. The power supply apparatus 1000-2 may include or may be similar in many respects to at least one of the power supply apparatus 1000 and 1000-1 described above with reference to FIGS. 3 to 4C and may include additional features not mentioned above.

Referring to FIG. 5, the control circuit 200 of the power supply apparatus 1000-2 may include an analog block 200-1 and a digital block 200-2.

Continuing to refer to FIG. 5, the power supply apparatus 1000-2 may differ from the power supply apparatus 1000-1 of FIG. 4A in that the delay circuit 250 and the deadtime generator 280 may be implemented digitally in the digital block 200-2.

The digital block 200-2 may be implemented through a digital integrated circuit (IC) and/or a processor and may include the delay function module 250-1, deadtime module 280-1, and OTP 50.

The delay function module 250-1 may be configured to perform the function of the delay circuit 250 as described with reference to FIG. 4A, and the deadtime module 280-1 may be configured to perform the function of the deadtime generator 280 as described with reference to FIG. 4A.

For example, the delay function module 250-1 may receive the output $V_{ZCD}$ of the comparator 240, and may transmit a signal $V_{ZCD}$* in which an input signal is delayed for a predetermined time period to a SET (S) signal of the R-S latch 230. In an embodiment, the deadtime module 280-1 may receive the outputs $V_{GL}$, $V_{GH}$ of the R-S latch 230, and may apply the output signals $V_{BL}$*, $V_{GH}$*, to which the first and second deadtimes are applied, to the gate driver 290. In an optional or additional embodiment, the output signal $V_{GH}$* may be input to the sawtooth generator 210.

The one-time programmable (OTP) 50 may be and/or may include a one-time programmable memory. In an embodiment, the OTP 50 may store a program for allowing the digital IC and/or processor to perform the functions of the delay function module 250-1 and the deadtime module 280-1 as described above.

Figure 6:
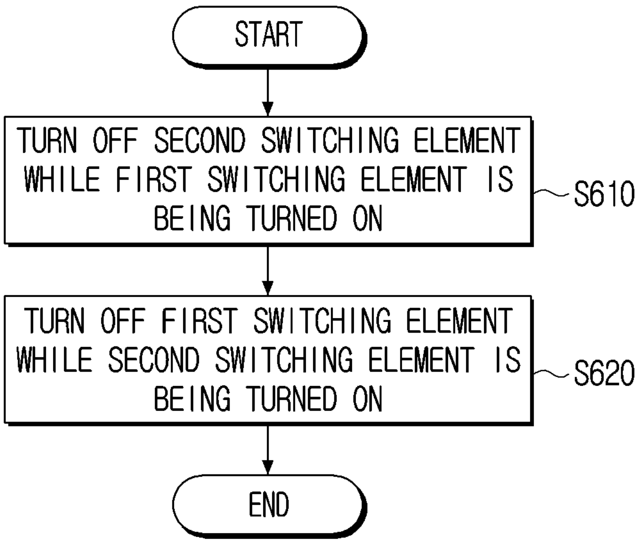
FIG. 6 is a flowchart of a method of controlling a power supply apparatus, according to one or more embodiments of the disclosure.

FIG. 6 is a flowchart of a method of controlling a power supply apparatus, according to one or more embodiments of the disclosure. In describing FIG. 6, duplicate descriptions may be omitted for the sake of brevity.

The power supply apparatus 1000 may include the power inputter 110 configured to receive AC voltage for rectification, the inductor L connected to one end of the power inputter 110, and the outputter 150 configured to output a DC voltage based on current discharged from the inductor L. The power supply apparatus 1000 may turn off the second switching element $M_2$ to discharge current charged in the inductor L while the first switching element $M_1$ configured to charge current in the inductor L is being turned on. Alternatively or additionally, the power supply apparatus 1000 may turn off the first switching element $M_2$ while the first switching element $M_1$ is being turned on in operation S610.

While the second switching element $M_2$ is being turned on, the first switching element $M_1$ may be turned off in operation S620.

The power supply apparatus 1000 may include a sensing resistor $R_S$ to sense current of the inductor L and based on the sensing voltage $V_{CS}$ sensed through the sensing resistor $R_S$ reaching a control voltage $\overline{V_{COMP}}$ determined based on the DC voltage output through the outputter 150, may turn off the first switching element $M_1$.

Before the sensing voltage $V_{CS}$ reaching the control voltage $\overline{V_{COMP}}$, based on a predetermined time being elapsed from a time point when the first switching element $M_1$ is turned on, the first switching element $M_1$ may be turned off. At this time, the preset time $T_{ON\_MAX}$ may be preset to a value at which a time interval on which the first switching element $M_1$ is turned on is maximum at a minimum voltage of the AC voltage.

The power supply apparatus 1000 may turn on the second switching element $M_2$ after a first deadtime from a time point when the first switching element $M_1$ is turned off, and turn on the first switching element $M_1$ after a second deadtime from a time point when the second switching element $M_2$ is turned off. In an embodiment, the first deadtime and the second deadtime may have different values.

The power supply apparatus 1000 may turn off the second switching element $M_2$ after a predetermined delay time from a time point when the current of the inductor becomes zero (0).

Although the descriptions above describe an example in which a sensing resistor $R_S$ is used to sense a current flowing through the inductor L, the present disclosure is not limited thereto. For example, according to one or more embodiments, an auxiliary winding may be used instead of a sensing resistor $R_S$ to sense a current flowing through the inductor L.

According to various embodiments, a CRM PFC with a reduced inductor size is provided by reducing an inductor current of the CRM PFC converter while satisfying harmonic and power factor related international standards required for a display product, such as, but not limited to, a TV. Alternatively or additionally, soft switching (e.g., zero voltage, zero current switching) may be provided over an entire AC input voltage range by using synchronous rectification switch $M_2$ instead of a diode and through proper additional on-time control. Therefore, conduction loss may be minimized, thereby maximizing efficiency improvement when compared to related power supply apparatuses.

Various embodiments of the disclosure may implement at least some functions in software including instructions stored in machine-readable storage media that may be read by a machine (e.g., a computer). Here, the device may be and/or may include an electronic device which may call a command stored in a storage medium and operate according to the called command. The device may be and/or may include the power supply apparatus 1000 and/or an electronic device that receives power from the power supply apparatus 1000, according to the disclosed embodiments.

When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the “non-transitory” storage medium may not include a signal but is tangible, and does not distinguish the case in which a data is semi-permanently stored in a storage medium from the case in which a data is temporarily stored in a storage medium.

According to one or more embodiments, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it may be understood by those of ordinary skill in the art that various changes in form and details may be made therein without departing from the spirit and scope of the disclosure, including the appended claims and their equivalents.

What is claimed is:

1. A power supply apparatus, comprising:

a power factor correction (PFC) circuit; and a control circuit configured to control an operation of the PFC circuit, wherein the PFC circuit comprises:

a power inputter configured to receive alternating current (AC) voltage to be rectified;

an inductor having a first end coupled to a first end of the power inputter;

a first switching element configured to be turned on and turned off, according to a first control signal, and having a first end coupled to a second end of the inductor;

a second switching element configured to be turned on and turned off, according to a second control signal, and having a first end commonly coupled to the second end of the inductor and the first end of the first switching element; and an outputter configured to output a direct current (DC) voltage through an output capacitor, and having a first end coupled to a second end of the second switching element and a second end coupled to a second end of the first switching element, wherein the control circuit is further configured to:

apply the first control signal to the first switching element and the second control signal to the second switching element such that the first switching element and the second switching element are alternately turned on, turn off the first switching element through the first control signal based on a predetermined time being elapsed from a time point when the first switching element is turned on while a sensing voltage is less than a control voltage, and turn off the second switching element through the second control signal after a predetermined delay time from a time point when a current of the inductor becomes zero such that the current of the inductor becomes negative to provide energy for zero voltage switching of the first switching element.

2. The power supply apparatus of claim 1, wherein:

the PFC circuit further comprises a sensing resistor having a first end coupled to the second end of the first switching element and second end coupled to a second end of the power inputter, and the control circuit is further configured to, based on the sensing voltage applied to the second end of the sensing resistor reaching the control voltage and the predetermined time being elapsed, turn off the first switching element through the first control signal, the control voltage having been determined based on the DC voltage output through the outputter.

3. The power supply apparatus of claim 2, wherein the control circuit comprises:

an error amplifier configured to amplify and output a difference between a voltage distribution value of the DC voltage and a first reference voltage; and a first comparator configured to compare the control voltage and the sensing voltage, the control voltage being a reverse of an output of the error amplifier, wherein the control circuit is further configured to determine whether the sensing voltage reaches the control voltage based on an output of the first comparator.

4. The power supply apparatus of claim 2, wherein the control circuit comprises:

a sawtooth generator configured to generate a sawtooth wave in which a voltage rises at a predetermined slope from a time when the first switching element is turned on; and a second comparator configured to compare the sawtooth wave output from the sawtooth generator with a second reference voltage, and wherein the control circuit is further configured to generate, based on an output of the second comparator, the first control signal for turning off the first switching element.

5. The power supply apparatus of claim 2, wherein the predetermined time is preset to a maximum time interval on which the first switching element is turned on at a minimum voltage of the AC voltage input to the power inputter.

6. The power supply apparatus of claim 1, wherein the control circuit is further configured to:

turn on the second switching element through the second control signal after a first deadtime from a first time point when the first switching element is turned off; and turn on the first switching element through the first control signal after a second deadtime from a second time point when the second switching element is turned off.

7. The power supply apparatus of claim 6, wherein a first duration of the first deadtime is different from a second duration of the second deadtime.

8. The power supply apparatus of claim 6, wherein:

the PFC circuit further comprises a sensing resistor having a first end coupled to the second end of the first switching element and a second end coupled to a second end of the power inputter, the control circuit comprises a third comparator configured to compare the sensing voltage applied to the second end of the sensing resistor with a critical voltage, and the control circuit is further configured to determine the time point at which the current of the inductor becomes zero based on an output of the third comparator.

9. The power supply apparatus of claim 6, wherein the control circuit further comprises a digital circuit configured to generate the first deadtime, the second deadtime, and a preset delay time.

10. A method of controlling a power supply apparatus, the method comprising:

turning off a second switching element of the power supply apparatus configured to discharge current charged in an inductor while a first switching element of the power supply apparatus configured to charge current in the inductor is being turned on;

turning off the first switching element while the second switching element is being turned on;

turning off the first switching element based on a predetermined time being elapsed from a time point when the first switching element is turned on while a sensing voltage is less than a control voltage; and turning off the second switching element through a second control signal after a predetermined delay time from a time point when a current of the inductor becomes zero such that the current of the inductor becomes negative to provide energy for zero voltage switching of the first switching element.

11. The method of claim 10, further comprising:

sensing the sensing voltage through a sensing resistor; and determining the control voltage based on a direct current (DC) voltage output.

12. The method of claim 10, wherein the predetermined time is preset to a maximum time interval on which the first switching element is turned on at a minimum voltage of a received alternating current (AC) voltage input to a power inputter of the power supply apparatus.

13. The method of claim 10, further comprising:

generating, based on a comparison between a sawtooth wave and a second reference voltage, a first control signal for turning off the first switching element.

14. The method of claim 11, further comprising:

determining whether the sensing voltage reaches the control voltage based on a comparison of the control voltage and the sensing voltage, the control voltage being a reverse of an output of an error amplifier, the output of the error amplifier being an amplified difference between a voltage distribution value of the DC voltage and a first reference voltage.

15. The method of claim 10, further comprising:

turning on the second switching element through the second control signal after a first deadtime from a first time point when the first switching element is turned off; and turning on the first switching element through a first control signal after a second deadtime from a second time point when the second switching element is turned off.

16. A power supply apparatus, comprising:

a power factor correction (PFC) circuit; and a control circuit configured to control an operation of the PFC circuit, wherein the PFC circuit comprises:

a power inputter configured to receive alternating current (AC) voltage to be rectified;

an inductor having a first end coupled to a first end of the power inputter;

a first switching element configured to be turned on and turned off, according to a first control signal, and having a first end coupled to a second end of the inductor;

a second switching element configured to be turned on and turned off, according to a second control signal, and having a first end commonly coupled to the second end of the inductor and the first end of the first switching element; and an outputter configured to output a direct current (DC) voltage through an output capacitor, and having a first end coupled to a second end of the second switching element and a second end coupled to a second end of the first switching element, wherein the control circuit is further configured to:

apply the first control signal to the first switching element and the second control signal to the second switching element such that the first switching element and the second switching element are alternately turned on;

turn on the second switching element through the second control signal after a first deadtime from a first time point when the first switching element is turned off;

turn on the first switching element through the first control signal after a second deadtime from a second time point when the second switching element is turned off; and turn off the first switching element through the first control signal based on a predetermined time being elapsed from a time point when the first switching element is turned on while a sensing voltage is less than a control voltage; and turn off the second switching element through the second control signal after a predetermined delay time from a time point when a current of the inductor becomes zero such that the current of the inductor becomes negative to provide energy for zero voltage switching of the first switching element.

17. The power supply apparatus of claim 16, wherein the PFC circuit further comprises a sensing resistor having a first end coupled to the second end of the first switching element and second end coupled to a second end of the power inputter, and wherein the control circuit is further configured to:

sense the sensing voltage through the sensing resistor, and determine the control voltage based on a direct current (DC) voltage output.

* * * * *